(12) United States Patent
Perret-Gentil

(10) Patent No.: US 8,463,128 B2
(45) Date of Patent: Jun. 11, 2013

(54) TRANSLATION OF RAW FORMATTED INFRARED CODES

(75) Inventor: John Irwin Perret-Gentil, Boca Raton, FL (US)

(73) Assignee: OpenPeak Inc., Boca Raton, FL (US)

( * ) Notice: Subject to any disclaimer, the term of this patent is extended or adjusted under 35 U.S.C. 154(b) by 351 days.

(21) Appl. No.: 12/983,071

(22) Filed: Dec. 31, 2010

(65) Prior Publication Data

US 2012/0170946 A1 Jul. 5, 2012

(51) Int. Cl.
*H04B 10/00* (2006.01)

(52) U.S. Cl.
USPC ............................ 398/106; 398/107; 398/202

(58) Field of Classification Search
USPC ................................ 398/77, 106–107, 202
See application file for complete search history.

(56) References Cited

U.S. PATENT DOCUMENTS

| 5,319,487 | A | * | 6/1994 | Sato et al. ...................... 398/106 |
| 6,031,470 | A | * | 2/2000 | Asari et al. ...................... 341/22 |
| 7,450,852 | B2 | * | 11/2008 | Calhoon ...................... 398/106 |
| 8,134,454 | B2 | * | 3/2012 | Ha et al. ...................... 340/12.3 |
| 8,139,942 | B2 | * | 3/2012 | Tsurumoto et al. ........... 398/106 |

* cited by examiner

*Primary Examiner* — Dzung Tran

(57) ABSTRACT

A method of translating raw formatted IR codes to discrete formatted IR codes. A raw formatted IR message representing an IR code can be detected. The IR message can include a raw formatted device ID including a first series of IR pulses and a raw formatted command ID including a second series of IR pulses. The IR message can be encoded into a definition that defines the first and second series of pulses contained in the IR message. Encoded data corresponding to the device ID and the command ID can be identified. The encoded data corresponding to the device ID can be matched to a particular device to identify a discrete formatted device ID. The encoded data corresponding to the command ID can be matched to a particular command to identify a discrete formatted command ID. The discrete formatted device ID and the discrete formatted command ID can be stored.

21 Claims, 3 Drawing Sheets

TRANSLATION OF RAW FORMATTED INFRARED CODES

BACKGROUND

1. Field of Technology

The present description generally relates to remote control units and, more particularly, to translation of raw formatted infrared (IR) codes.

2. Background

When creating a set of IR remote control codes, such IR codes are encoded by an IR learning device that stores each code in a "raw" format. IR codes in the raw format generally include a series of on/off commands that define IR pulses by activating and deactivating a light emitting diode (LED) within an IR transmitter.

An example of an IR message 100 defined by a raw IR code is depicted in FIG. 1. The IR message can include a plurality of IR bursts 102, 104, 106, each of which includes at least one IR pulse 108. The period (i.e. duration) 110 of each IR pulse 108, the period 112 between IR pulses 108, and the number of IR pulses 108 generally vary for different raw IR codes. Moreover, the carrier frequency of the light emitted by the LED for each IR pulse 108 can vary for different raw codes. In this regard, it is the on/off commands and the carrier frequency that are defined by each raw IR code.

The IR message 100 can begin with the IR burst 102, which indicates that the IR message 100 is distinct from previously transmitted IR messages. The IR burst 102 can be a start signal that indicates that the IR message 100 is starting, or a repeat signal that indicates that the IR message 100 is repeating.

Each IR burst 104, 106 can correspond to a particular type of identifier. For example, the IR burst 104 can correspond to a device identifier (device ID) and the IR burst 106 can correspond to a command identifier (command ID). Further, certain IR protocols may provide for an IR burst 114 between the end of the IR burst 104 and the beginning of the IR burst 106 so as to distinguish the device ID from the command ID, though this is not always the case. Other protocols may provide a certain time period, or delay, between the end of the IR burst 104 and the beginning of the IR burst 106 so as to distinguish the device ID from the command ID. Still, other protocols may provide a certain number of pulses in the IR burst 104, and after that number of pulses, it may be assumed that the remaining pulses correspond to the IR burst 106.

Raw IR codes typically are not unified across different electronic devices that are being controlled. Instead, many electronic devices use a unique protocol having a dedicated raw code set. These unique code sets oftentimes must be generated for each electronic device, which increases the number of codes and code sets in the database. For example, the numeric 1 command of a particular television model may be learned and stored in raw format as a unique command. Then, the same numeric 1 command of another television model also may be learned and stored in raw format as another unique command. Even though a particular manufacturer may use the same raw codes among different device models, this is not always the case. Given the larger number of different devices that use IR remote controls, a database of IR codes many contain hundreds of thousands of codes.

Further, codes in raw format can be considerably long due to noise in the IR message. For example, noise may affect the way the raw is encoded, and hence in increase the length of a command. Accordingly, the size of a database used to store the raw IR codes can be significantly large, especially for an embedded system.

SUMMARY

The present description relates to a method of translating raw formatted infrared (IR) codes to discrete formatted IR codes. The method can include, via a processor, detecting a raw formatted IR message representing an IR code. The IR message can include a raw formatted device identifier (device ID) including a first series of IR pulses and the IR message can include a raw formatted command identifier (command ID) including a second series of IR pulses. The method also can include, via the processor, encoding the IR message into a definition that defines the first and second series of pulses contained in the IR message, identifying encoded data corresponding to the device ID and encoded data corresponding to the command ID contained in the encoded IR message, matching the encoded data corresponding to the device ID to a particular device to identify a discrete formatted device ID, matching the encoded data corresponding to the command ID to a particular command to identify a discrete formatted command ID, and storing the discrete formatted device ID and the discrete formatted command ID to a data storage.

The method further can include, via the processor, analyzing the IR pulses to identify a discrete formatted protocol identifier (protocol ID) corresponding to a protocol to which the IR message confirms. Analyzing the IR pulses to identify the discrete formatted protocol ID can include determining a carrier frequency of the IR pulses. Analyzing the IR pulses to identify the discrete formatted protocol ID also can include determining a duration of a plurality of the IR pulses and determining periods between successive IR pulses. The method also can include, via the processor, storing the discrete formatted protocol ID to the data storage.

The method further can include, via the processor, identifying a start signal of the IR message. The first series of IR pulses can follow the start signal of the IR message. The encoded data corresponding to the first series of IR pulses can be identified as corresponding to the device ID. The second series of IR pulses can follow the first series of IR pulses. The encoded data corresponding to the second series of IR pulses can be identified as corresponding to the command ID.

In another arrangement, the method further can include, via the processor, identifying a start signal of the IR message and identifying a repeat signal of the IR message. The first series of IR pulses can follow the start signal of the IR message, but occur before the repeat signal of the IR message. The encoded data corresponding to the first series of IR pulses can be identified as corresponding to the device ID. The second series of IR pulses can follow the repeat signal of the IR message. The encoded data corresponding to the second series of IR pulses can be identified as corresponding to the command ID.

Another embodiment relates to an IR code translator that translates raw formatted infrared (IR) codes to discrete formatted IR codes. The IR code translator can include a detector that detects a raw formatted IR message representing an IR code. The IR message can include a raw formatted device ID including a first series of IR pulses. The IR message also can include a raw formatted command ID including a second series of IR pulses. The IR code translator further can include a processor that encodes the IR message into a definition that defines the first and second series of pulses contained in the IR message, identifies encoded data corresponding to the device ID and encoded data corresponding to the command ID contained in the encoded IR message, matches the encoded data corresponding to the device ID to a particular device to identify a discrete formatted device ID, matches the encoded data corresponding to the command ID to a particular command to identify a discrete formatted command ID, and stores the discrete formatted device ID and the discrete formatted command ID to a data storage.

The processor also can analyze the IR pulses to identify a discrete formatted protocol ID corresponding to a protocol to which the IR message confirms. The processor further can determine a duration of a plurality of the IR pulses and determine periods between successive IR pulses. The processor further can determine a carrier frequency of the IR pulses. The processor can store the discrete formatted protocol ID to the data storage.

The processor also can identify a start signal of the IR message. The first series of IR pulses can follow the start signal of the IR message. The encoded data corresponding to the first series of IR pulses can be identified as corresponding to the device ID. The second series of IR pulses can follow the first series of IR pulses. The encoded data corresponding to the second series of IR pulses can be identified as corresponding to the command ID.

The processor also can identify a start signal of the IR message and a repeat signal of the IR message. The first series of IR pulses can follow the start signal of the IR message, but occur before the repeat signal of the IR message. The encoded data corresponding to the first series of IR pulses can be identified as corresponding to the device ID. The second series of IR pulses can follow the repeat signal of the IR message. The encoded data corresponding to the second series of IR pulses can be identified as corresponding to the command ID.

Yet another embodiment can include a computer program product including a computer-readable storage medium having computer-usable program code that, when executed, causes a machine to perform the various steps and/or functions described herein.

BRIEF DESCRIPTION OF THE DRAWINGS

Embodiments will be described below in more detail, with reference to the accompanying drawings, in which.

DETAILED DESCRIPTION

While the specification concludes with claims defining features that are regarded as novel, it is believed that the claims will be better understood from a consideration of the description in conjunction with the drawings. As required, detailed embodiments are disclosed herein; however, it is to be understood that the disclosed embodiments are merely exemplary and can be embodied in various forms. Therefore, specific structural and functional details disclosed herein are not to be interpreted as limiting, but merely as a basis for the claims and as a representative basis for teaching one skilled in the art to variously employ virtually any appropriately detailed structure. Further, the terms and phrases used herein are not intended to be limiting but rather to provide an understandable description.

Arrangements described herein relate to converting raw formatted infrared (IR) codes (hereinafter "raw IR codes") to discrete formatted IR codes (hereinafter "discrete IR codes") and storing the discrete formatted IR codes to a database. The discrete IR codes typically will be much shorter in length than corresponding raw IR codes. Accordingly, a much smaller database is required to store discrete IR codes in comparison to the size of a database that would be required to store equivalent raw IR codes. Thus, less storage capacity is required to store a discrete IR code database. Moreover, conversion to discrete IR codes can eliminate code repetition and provide for highly reliable data transmission.

Figure 1:
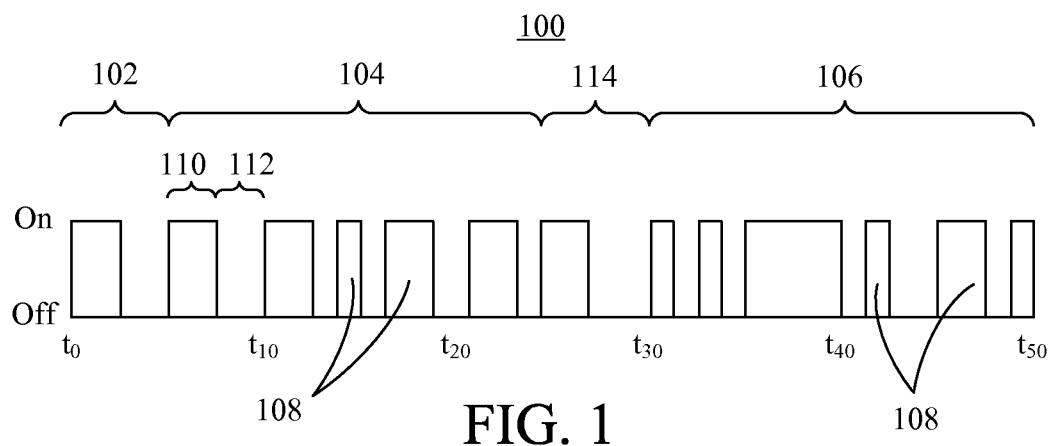
FIG. 1 depicts an IR message defined by a raw IR code that is useful for understanding the present description.
Figure 2:
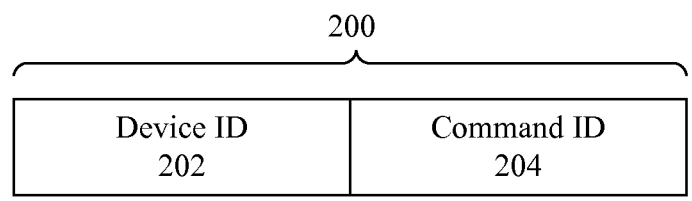
FIG. 2 depicts a structure of a raw IR code that is useful for understanding the present description.

FIG. 2 depicts a structure of a raw IR code 200 that is useful for understanding the present description. As used herein, the term "raw IR code" means an IR code in the raw IR format. Each raw IR code 200 typically includes a device identifier (hereinafter "device ID") 202 and a command identifier (hereinafter "command ID") 204, both in raw IR format. Together, along with a start signal or repeat signal, the device ID 202 and command ID 204 can define an IR message, such as the IR message 100 depicted in FIG. 1.

By way of example, the device ID 202 can define a first IR burst 104, or series, of IR pulses that follow a start signal (represented by IR bursts 102) in the IR message 100. The command ID 204 can define a second burst 106, or series, of IR pulses that follow the start signal in the IR message 100. In one arrangement, the second burst 106 can follow the first burst 104 without an intermediate repeat signal, though there may be a certain time period, or delay, between the end of the first IR burst 104 and the beginning of the second IR burst 106. In another arrangement, a repeat signal represented by an IR burst 114 can be provided between the end of the first IR burst 104 and the beginning of the second IR burst 106. If the IR message is repeated, the IR burst 102 may be referred to as a repeat signal, though the IR burst 102 would be distinguished from the IR burst 114, which also may be referred to as a repeat signal in some protocols.

At this point it should be noted that the terms "first" and "second" described in the previous paragraph are merely ordinal terms being used to distinguish the IR burst corresponding to the device ID and the IR burst corresponding to the command ID. Thus, an IR burst for a repeat signal may be contained between the first IR burst and the second IR burst. Moreover, using a different ordinal notation, the IR burst 102 corresponding to the start signal may be referred to as a first IR burst, the IR burst 104 corresponding to the device ID 202 may be referred to as a second IR burst, and the IR burst 106 corresponding to the command ID 204 may be referred to as a third IR burst. With another ordinal notation, the IR burst 102 corresponding to the start signal may be referred to as a first IR burst, the IR burst 104 corresponding to the device ID 202 may be referred to as a second IR burst, the IR burst 114 corresponding to a repeat signal may be referred to as a third IR burst, and the IR burst corresponding to the command ID 204 may be referred to as a fourth IR burst.

The definition for each of the IR bursts 104, 106 can include the number of IR pulses, duration of the IR pulses, periods between IR pulses, and carrier frequency of each IR pulse contained in the respective IR bursts. In this regard, the device ID 202 and command ID 204 each can specifically include a series of on/off commands that define the series of IR pulses 108 contained in each of the respective IR bursts 104, 106.

As used herein, the term "device ID" means an identifier that identifies a device to which the raw IR code 200 may be communicated to provide the command ID 204. In this regard, a device ID 202 may be unique to a particular model of device, for example a particular television model, a particular audio component model, a particular lighting system model, etc.

As used herein, the term "command ID" means an identifier that is recognized as a control input to a device, and corresponds to a particular command to be executed when the raw IR code 200 is received. Examples of commands include, but are not limited to, commands that correspond to power toggle, play, pause, stop, channel up, channel down, channel jump, volume increase, volume decrease, lighting increase, lighting decrease, numeric inputs, and the like. Notably, commands are not limited to these examples. Indeed, there are a plethora of commands known to those skilled in the art and the present arrangements are not limited in this regard.

Figure 3:
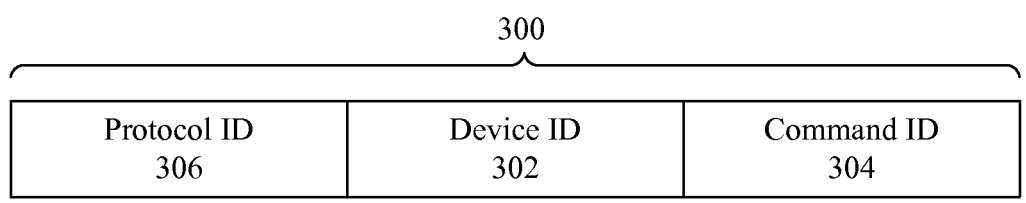
FIG. 3 depicts a structure of a discrete IR code that is useful for understanding the present description.

FIG. 3 depicts a structure of a discrete IR code 300 that is useful for understanding the present description. As used herein, the term "discrete IR code" means an IR code in a discrete IR format that is distinct from the raw IR format. More particularly, rather than specifically including the on/off commands used to generate the IR pulses in the IR message, the discrete IR code 300 can be stored as a fixed size of digital bits, for example bytes and words, that may be processed to retrieve the requisite on/off commands.

The discrete IR code 300 can include a device ID 302, a command ID 304 and a protocol identifier (hereinafter "protocol ID") 306. As used herein, a protocol ID is an identifier that indicates a particular raw IR protocol to be used to communicate the device ID 302 and the command ID 304 when the identifiers 302, 304 are to be communicated to a device. In illustration, assume that the discrete IR code 300 corresponds to the IR message 100 of FIG. 1. When the raw IR message 100 is to be communicated, the discrete IR code 300 can be accessed. Based on the protocol ID 306, the device ID 302 can be processed to identify and generate the requisite on/off commands to generate a corresponding first series of IR pulses, and the command ID 304 can be processed to identify and generate the requisite on/off commands to generate a corresponding second series of IR pulses.

Each discrete IR code 300 can be stored to a suitable data table. In illustration, the data table can include fields for the protocol ID 306, the device ID 302 and the command ID 304.

Figure 4:
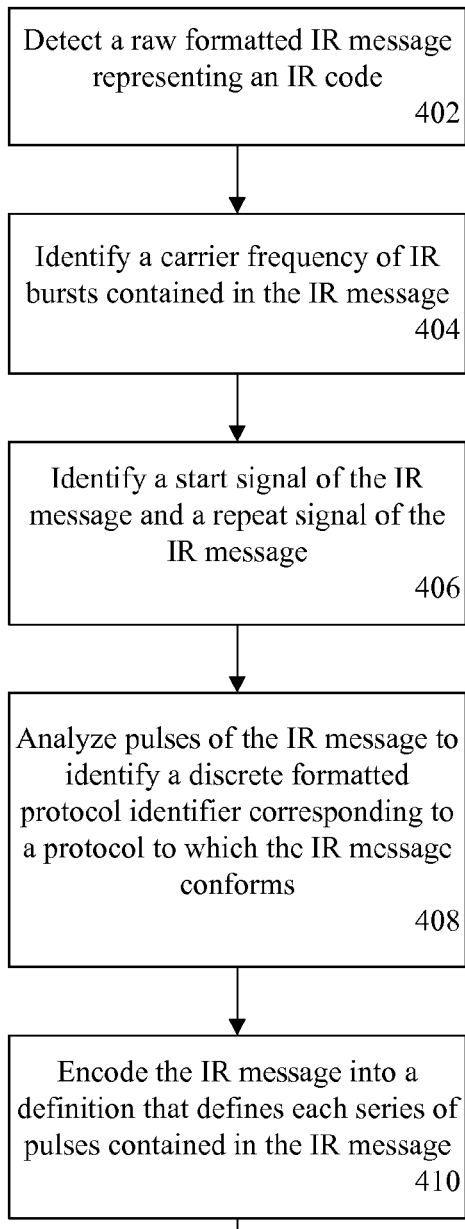
FIG. 4 is a flowchart that depicts a method of translating raw IR code to discrete IR code that is useful for understanding the present description.

FIG. 4 is a flowchart that depicts a method 400 of translating raw IR code to discrete IR code. At step 402, a raw formatted IR message representing an IR code can be detected. For instance, if the IR message is transmitted via an IR signal, the IR message can be detected with a suitable IR detector. If the IR message is communicated via an electrical signal, the IR message can be detected with a suitable electrical signal detector. At step 404, a carrier frequency of IR pulses contained in the IR message can be detected, for example using one of the aforementioned detectors. Examples of such detectors will be discussed herein.

At step 406, a start signal of the IR message can be detected and a repeat signal of the IR message can be detected. The start signal can be an IR pulse contained at the start of a first instance of the IR message that indicates the IR message is beginning In certain protocols, the repeat signal can be an IR pulse contained at the start of a next instance of the IR message that indicates that the IR message is being repeated. In other protocols, the repeat signal can be an IR pulse contained in the first instance of the IR message, but which distinguishes different portions of the IR message. Based on the IR start and repeat signals, the pertinent portion(s) of the IR message which contains or contain the device ID and command ID can be identified.

At step 408, pulses contained in the IR message can be analyzed to identify a discrete formatted protocol identifier corresponding to a protocol to which the IR message conforms. In illustration, the duration of each of a plurality of the IR pulses and periods between successive pulses can be determined. The carrier frequency of the IR pulses also can be determined. Data corresponding to the carrier frequency, pulse durations and/or periods between pulses can be used to query a data table of known IR protocols to identify which protocol was used to generate the IR message. Based on this query, the IR protocol used to generate the IR message can be identified. In one aspect of the inventive arrangements, both the initial and repeat sequences can be analyzed to identify the discrete formatted IR protocol.

At step 410, the IR message can be encoded into a definition that defines series of pulses contained in the IR message. In illustration, the definition can specify a series of IR pulses contained in device ID and a series of IR pulses contained in the command ID portions of the IR message, as well as periods between these IR bursts. The definition also can include the carrier frequency used for the IR pulses. When encoding the IR message, the series of pulses contained in the IR message, along with the carrier frequency, can be analyzed to determine how they correlate to the identified protocol. In this manner, the encoding process can ensure that the definition which is generated will conform to the identified protocol.

At step 412, the encoded device ID and the encoded command ID contained in the encoded IR message can be identified. Specifically, encoded data corresponding to the first series of IR pulses that follow the IR message start signal or repeat signal can be identified as corresponding to the device ID. Encoded data corresponding to the second series of IR pulses in the IR message, which follow the first series of IR pulses, can be identified as corresponding to the command ID.

At step 414, the encoded data corresponding to the device ID can be matched to a particular device to identify a discrete formatted device ID. In illustration, the encoded data can be used to query a data table of known devices that are associated with the identified protocol. Based on this query, the device that corresponds to the first series of IR pulses can be identified. More particularly, the query can be processed to identify the appropriate device record within the data table, and the device ID can be copied from the identified record.

At step 416, the encoded data corresponding to the command ID can be matched to a particular command to identify a discrete formatted command ID. In illustration, the encoded data can be used to query a data table of known commands which are associated with the identified protocol. Based on this query, the command that corresponds to the second series of IR pulses can be identified. Specifically, the query can be processed to identify the appropriate command record within the data table, and the command ID can be copied from the identified record.

At step 418, the discrete formatted protocol ID, discrete formatted device ID and discrete formatted command ID identified at steps 408, 414 and 416, respectively, can be stored to a data storage. For example, the identifiers can be stored in a new record of a discrete IR code data table. In one aspect of the inventive arrangements, prior to storing the identifiers, the data table can be searched to determine if a corresponding record already exists. If such record already exists, a new record need not be created.

Figure 5:
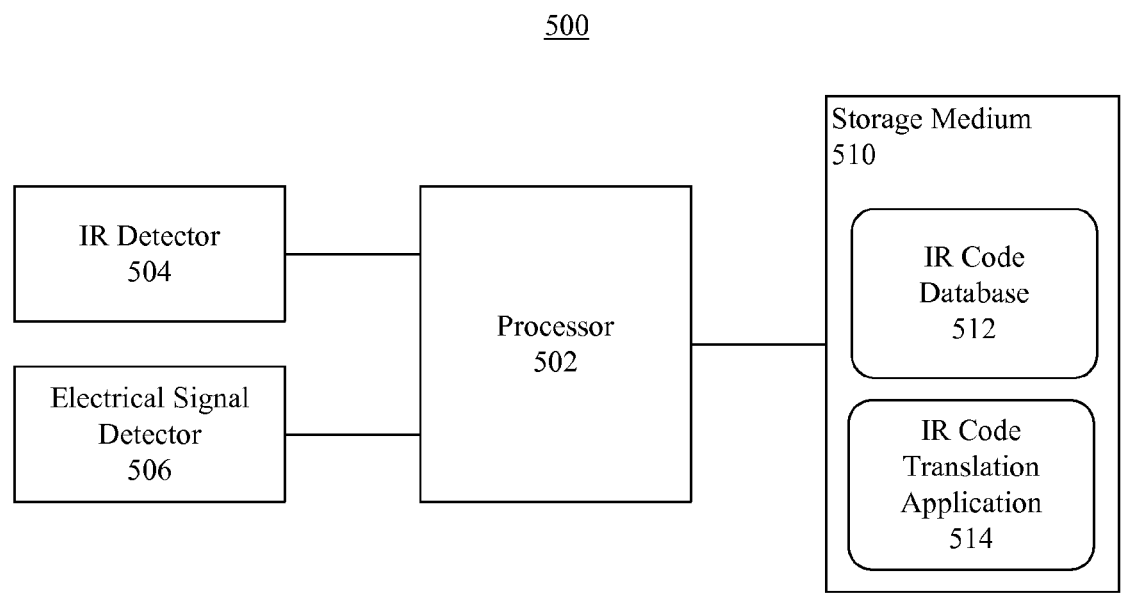
FIG. 5 is a block diagram of a IR code translator that is useful for understanding the present description.

FIG. 5 is a block diagram of an example of an IR code translator 500. The IR code translator 500 can include a processor 502, which may comprise, for example, one or more central processing units (CPUs), one or more digital signal processors (DSPs), one or more application specific integrated circuits (ASICs), one or more programmable logic devices (PLDs), a plurality of discrete components that can cooperate to process data, and/or any other suitable processing device. In an arrangement in which a plurality of such components are provided, the components can be coupled together to perform various processing functions as described herein.

The IR code translator 500 also can include an IR detector 504. The IR detector 504 can detect IR signals transmitted by an IR transmitter, such as an IR transmitter within a remote control device, and demodulate such signals to convert the IR signals into electrical signals that may be processed by the processor 502. In this regard, the IR detector 504 can include a light receiving device, such as a light detection diode or other suitable light detection device (not shown). The IR detector 504 further may include a receiver (not shown) that processes detected IR signals into a format that may be processed by the processor 502. In another arrangement, the processor 502 can be configured to process signals received by the light detection device.

The IR code translator 500 further can include an electrical signal detector 506. The electrical signal detector 506 can detect IR signals originally formatted to be transmitted by an IR transmitter, but that bypass the IR transmitter so as to be communicated to the electrical signal detector 506. In another example, the electrical signal detector 506 can detect raw formatted IR messages provided by a raw IR code database. In this regard, the electrical signal detector 506 can process detected IR signals into a format that may be processed by the processor 502. In another arrangement, the processor 502 can be configured to process such signals. In such an arrangement, the IR signals may be input directly to the processor 502 using a suitable communication link.

The IR code translator 500 further can include a data storage 510 communicatively linked to the processor 502. The data storage 510 can include one or more storage devices, each of which may include, but is not limited to, a magnetic storage medium, an electronic storage medium, an optical storage medium, a magneto-optical storage medium, and/or any other storage medium suitable for storing digital information. In one arrangement, the data storage 510 can be integrated into the processor 502, though this need not be the case.

An IR code database 512 can be stored on the data storage 510 or otherwise made accessible to the processor 502. The IR code database 512 can include data tables that contain records corresponding to protocol identifiers that correspond to specific protocols, device identifiers which correspond to specific devices, command identifiers that correspond to specific commands, etc. In this regard, the IR code database 512 can include the data tables as previously described with respect to FIG. 4.

An IR code translation application 514 also can be stored on the data storage 510 or otherwise made accessible to the processor 502. The IR code translation application 514 can be embodied as computer-usable program code and executed by the processor 502 to implement the methods and processes described herein that are performed by the IR code translator 500. For example, the processor 502 can execute the IR code translation application 514 to detect raw formatted IR messages, encode the IR messages, identify encoded data corresponding to device IDs and encoded data corresponding to command IDs contained in the encoded IR messages, match the encoded data corresponding to the device IDs to particular devices to identify discrete formatted device IDs, match the encoded data corresponding to command IDs to particular commands to identify discrete formatted command IDs, and store the discrete formatted device IDs and the discrete formatted command IDs to the data storage 510 (e.g., to the IR code database 512). The various other processes described herein also can be performed by the processor 502.

In one aspect, various functions described as being performed by the IR code translation application 514 can be allocated among a plurality of applications. For example, detection of raw formatted IR messages and encoding of the IR messages can be performed by different applications.

The flowchart and block diagram in the figures illustrate the architecture, functionality, and operation of possible implementations of systems, methods and computer program products according to various embodiments. In this regard, each block in the flowchart or block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable or computer-readable program code that, when being loaded and executed, controls the processing system such that it carries out the methods described herein. The systems, components and/or processes also can be embedded in a computer-readable storage medium, such as a computer-readable storage medium of a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

The terms "computer program," "software," "application," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, an application can include, but is not limited to, a script, a subroutine, a function, a procedure, an object method, an object implementation, an executable application, an applet, a servlet, a MIDlet, a source code, an object code, a shared library/dynamic load library and/or other sequence of instructions designed for execution on a processing system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language).

Moreover, as used herein, ordinal terms (e.g. first, second, third, fourth, fifth, sixth, seventh, eighth, ninth, tenth, and so on) distinguish one message, signal, item, object, device, system, apparatus, step, process, or the like from another message, signal, item, object, device, system, apparatus, step, process, or the like. Thus, an ordinal term used herein need not indicate a specific position in an ordinal series. For example, a process identified as a "second process" may occur before a process identified as a "first process." Further, one or more processes may occur between a first process and a second process.

The present arrangements can be embodied in other forms without departing from the spirit or essential attributes thereof. Accordingly, reference should be made to the following claims, rather than to the foregoing specification, as indicating the scope of the invention.

What is claimed is:

1. A method of translating raw formatted infrared (IR) codes to discrete formatted IR codes, comprising:
   via a processor, detecting a raw formatted IR message representing an IR code, the IR message comprising a raw formatted device identifier (device ID) comprising a first series of IR pulses, and the IR message comprising a raw formatted command identifier (command ID) comprising a second series of IR pulses;
   via the processor, encoding the IR message into a definition that defines the first and second series of pulses contained in the IR message;
   via the processor, identifying encoded data corresponding to the device ID and encoded data corresponding to the command ID contained in the encoded IR message;
   via the processor, matching the encoded data corresponding to the device ID to a particular device to identify a discrete formatted device ID;
   via the processor, matching the encoded data corresponding to the command ID to a particular command to identify a discrete formatted command ID; and
   via the processor, storing the discrete formatted device ID and the discrete formatted command ID to a data storage.

2. The method of claim 1, further comprising:
   via the processor, analyzing the IR pulses to identify a discrete formatted protocol identifier (protocol ID) corresponding to a protocol to which the IR message confirms.

3. The method of claim 2, wherein analyzing the IR pulses to identify the discrete formatted protocol ID comprises determining a carrier frequency of the IR pulses.

4. The method of claim 2, wherein analyzing the IR pulses to identify the discrete formatted protocol ID comprises determining a duration of a plurality of the IR pulses and determining periods between successive IR pulses.

5. The method of claim 2, further comprising:
   via the processor, storing the discrete formatted protocol ID to the data storage.

6. The method of claim 1, further comprising:
   via the processor, identifying a start signal of the IR message;
   wherein:
      the first series of IR pulses follows the start signal of the IR message, and the encoded data corresponding to the first series of IR pulses are identified as corresponding to the device ID; and
      the second series of IR pulses follows the first series of IR pulses, and the encoded data corresponding to the second series of IR pulses are identified as corresponding to the command ID.

7. The method of claim 1, further comprising:
   via the processor, identifying a start signal of the IR message; and
   via the processor, identifying a repeat signal of the IR message;
   wherein:
      the first series of IR pulses follows the start signal of the IR message, but occur before the repeat signal of the IR message, and the encoded data corresponding to the first series of IR pulses are identified as corresponding to the device ID; and
      the second series of IR pulses follows the repeat signal of the IR message, and the encoded data corresponding to the second series of IR pulses are identified as corresponding to the command ID.

8. An IR code translator that translates raw formatted infrared (IR) codes to discrete formatted IR codes, the IR code translator comprising:
   a detector that detects a raw formatted IR message representing an IR code, the IR message comprising a raw formatted device identifier (device ID) comprising a first series of IR pulses, and the IR message comprising a raw formatted command identifier (command ID) comprising a second series of IR pulses; and
   a processor that encodes the IR message into a definition that defines the first and second series of pulses contained in the IR message, identifies encoded data corresponding to the device ID and encoded data corresponding to the command ID contained in the encoded IR message, matches the encoded data corresponding to the device ID to a particular device to identify a discrete formatted device ID, matches the encoded data corresponding to the command ID to a particular command to identify a discrete formatted command ID, and stores the discrete formatted device ID and the discrete formatted command ID to a data storage.

9. The IR code translator of claim 8, wherein the processor analyzes the IR pulses to identify a discrete formatted protocol identifier (protocol ID) corresponding to a protocol to which the IR message confirms.

10. The IR code translator of claim 9, wherein the processor determines a carrier frequency of the IR pulses.

11. The IR code translator of claim 9, wherein the processor determines a duration of a plurality of the IR pulses and determines periods between successive IR pulses.

12. The IR code translator of claim 9, wherein the processor stores the discrete formatted protocol ID to the data storage 13. The IR code translator of claim 8, wherein:
   the processor identifies a start signal of the IR message;
   the first series of IR pulses follows the start signal of the IR message, and the encoded data corresponding to the first series of IR pulses are identified as corresponding to the device ID; and
   the second series of IR pulses follows the first series of IR pulses, and the encoded data corresponding to the second series of IR pulses are identified as corresponding to the command ID.

14. The IR code translator of claim 8, wherein:
   the processor identifies a start signal of the IR message and a repeat signal of the IR message;
   the first series of IR pulses follows the start signal of the IR message, but occur before the repeat signal of the IR message, and the encoded data corresponding to the first series of IR pulses are identified as corresponding to the device ID; and the second series of IR pulses follows the repeat signal of the IR message, and the encoded data corresponding to the second series of IR pulses are identified as corresponding to the command ID.

15. A computer program product comprising:
a computer-readable storage medium comprising computer-usable program code stored thereon that translates raw formatted infrared (IR) codes to discrete formatted IR codes, the computer-readable storage medium comprising:
computer-usable program code that detects a raw formatted IR message representing an IR code, the IR message comprising a raw formatted device identifier (device ID) comprising a first series of IR pulses, and the IR message comprising a raw formatted command identifier (command ID) comprising a second series of IR pulses;
computer-usable program code that encodes the IR message into a definition that defines the first and second series of pulses contained in the IR message;
computer-usable program code that identifies encoded data corresponding to the device ID and encoded data corresponding to the command ID contained in the encoded IR message;
computer-usable program code that matches the encoded data corresponding to the device ID to a particular device to identify a discrete formatted device ID;
computer-usable program code that matches the encoded data corresponding to the command ID to a particular command to identify a discrete formatted command ID; and
computer-usable program code that stores the discrete formatted device ID and the discrete formatted command ID to a data storage.

16. The computer program product of claim 15, the computer-readable storage medium further comprising:
computer-usable program code that analyzes the IR pulses to identify a discrete formatted protocol identifier (protocol ID) corresponding to a protocol to which the IR message confirms.

17. The computer program product of claim 16, wherein the computer-usable program code that analyzes the IR pulses to identify the discrete formatted protocol ID comprises computer-usable program code that determines a carrier frequency of the IR pulses.

18. The computer program product of claim 16, wherein the computer-usable program code that analyzes the IR pulses to identify the discrete formatted protocol ID comprises computer-usable program code that determines a duration of a plurality of the IR pulses and determines periods between successive IR pulses.

19. The computer program product of claim 16, the computer-readable storage medium further comprising:
computer-usable program code that stores the discrete formatted protocol ID to the data storage.

20. The computer program product of claim 15, the computer-readable storage medium further comprising:
computer-usable program code that identifies a start signal of the IR message;
wherein:
the first series of IR pulses follows the start signal of the IR message, and the encoded data corresponding to the first series of IR pulses are identified as corresponding to the device ID; and
the second series of IR pulses follows the first series of IR pulses, and the encoded data corresponding to the second series of IR pulses are identified as corresponding to the command ID.

21. The computer program product of claim 15, the computer-readable storage medium further comprising:
computer-usable program code that identifies a start signal of the IR message;
computer-usable program code that identifies a repeat signal of the IR message;
wherein:
the first series of IR pulses follows the start signal of the IR message, but occur before the repeat signal of the IR message, and the encoded data corresponding to the first series of IR pulses are identified as corresponding to the device ID; and
the second series of IR pulses follows the repeat signal of the IR message, and the encoded data corresponding to the second series of IR pulses are identified as corresponding to the command ID.

* * * * *